Dec. 2, 1969     T. J. HARRIS     3,481,661
LIGHT DEFLECTOR
Filed Dec. 27, 1965
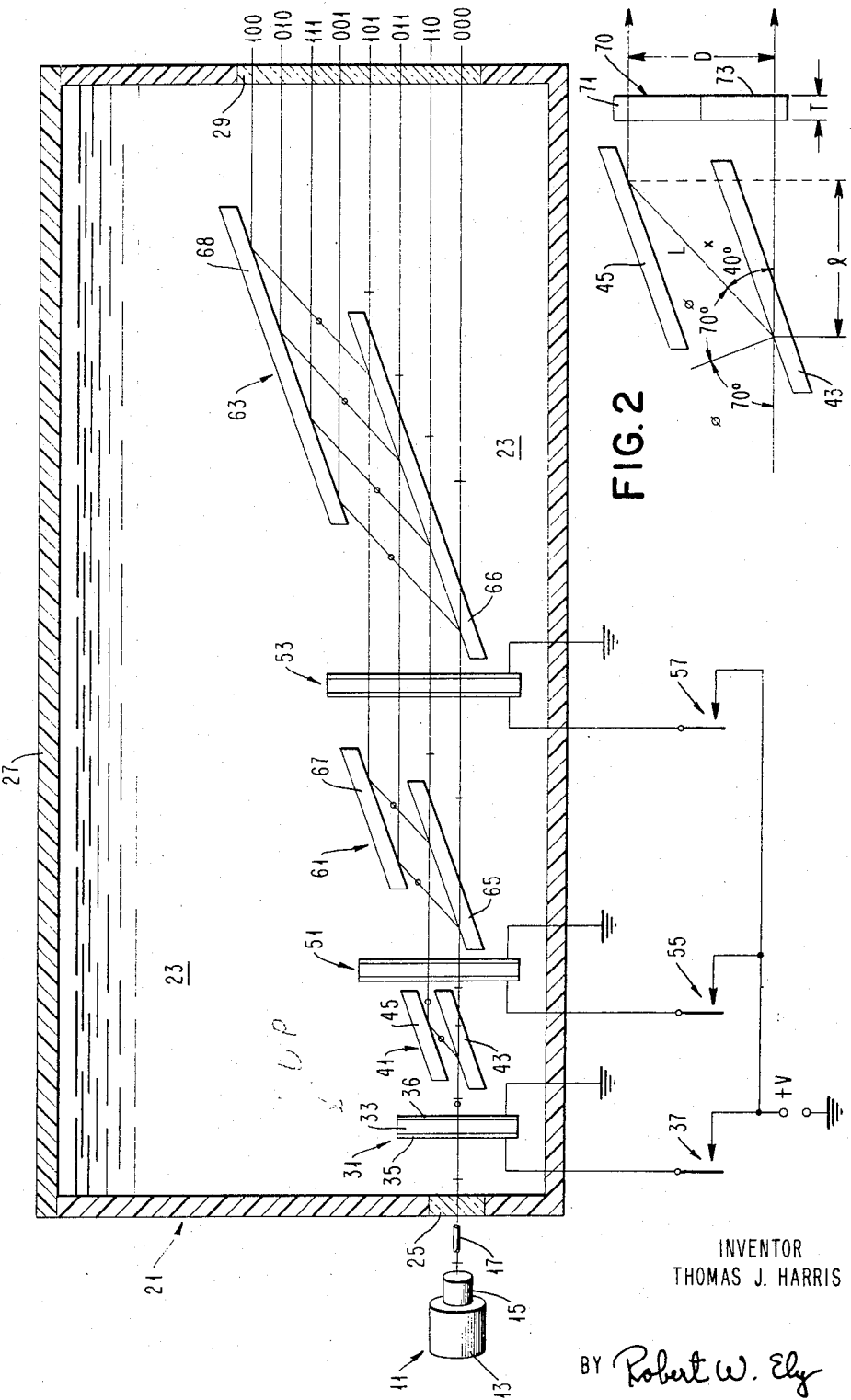
INVENTOR
THOMAS J. HARRIS
BY Robert W. Ely
ATTORNEY

United States Patent Office 3,481,661
Patented Dec. 2, 1969

3,481,661
LIGHT DEFLECTOR
Thomas J. Harris, Poughkeepsie, N.Y., assignor to International Business Machines Corporation, Armonk, N.Y., a corporation of New York
Filed Dec. 27, 1965, Ser. No. 516,367
Int. Cl. G02f 1/26
U.S. Cl. 350—150                10 Claims

ABSTRACT OF THE DISCLOSURE

Light deflection apparatus which eliminates refraction of any light beam in traversing the deflector. Each stage of the apparatus includes polarization rotation means, a thin birefringent plate disposed in a predetermined position with respect to an incident light beam and a thin alignment plate. By locating all of the elements of a deflector stage in predetermined positions in an index matching medium, all possible light beams traverse the same refraction index, and boundary refractions are eliminated.

---

This invention relates to light deflection systems and more particularly concerns such systems in which polarized light is selectively deflected.

It has been proposed to make a light deflector in which linearily polarized light is directed through a birefringent prism. This prism passes a light beam polarized in one direction in a substantially unaltered state but completely internally reflects a beam with the other polarization direction. Additional prisms are provided to align the path of the reflected and transmitted beams after they are acted upon by the birefringent prism. This light deflector is described in U.S. Patent No. 3,353,894 (assigned to the same assignee as this application). A disadvantage of this light deflector is that it uses strain-free birefringent prisms which are relatively expensive and are not readily available. Further, this deflector uses a prism to align the transmitted beam since it is refracted by passing into air after the birefringent prism. It is desirable to avoid the disadvantage of such refraction.

An object of this invention is to provide an improved light deflector which avoids the above-noted disadvantages.

Another object is the provision of an improved light deflection system which is relatively inexpensive and avoids refraction.

An additional object is to provide an improved light deflector in which electro-optic techniques are used to position a light beam without internal reflection in a birefringent prism.

A further object is the provision of an improved light deflector which uses external reflection, avoids refraction at material boundaries, and has optical path difference compensation.

In accordance with the disclosed embodiment of the invention, a single stage of the multistage light deflector includes a tank containing a liquid, a thin birefringent plate adapted to reflect one polarized light beam and to transmit another polarized light beam, and another plate arranged to align the reflected beam. An electro-optic switch is positioned in front of the plates so that the polarization of the light beam can be rotated ninety degrees (ordinary to extraordinary). The index of refraction of the liquid substantially matches the larger of the refractive indexes of the birefringent material (the ordinary index for calcite). The thin alignment plate is made from a material which has an index of refraction which matches or is less than the lower index of the birefringent crystal (the extraordinary index for calcite). A light beam which is linearly polarized in the direction of the ordinary ray will be completely transmitted at the boundary of the liquid and the birefringent material. Since the index of the liquid matches the index of the birefringent plate, the transmitted beam does not cross a boundary which gives refraction. The extraordinary beam which is reflected and aligned propagates through the liquid. Thus, both beams propagate through materials with the same index of refraction. When desired, the optical path difference can be compensated by a compensating plate which has a high index section for the transmitted beam and a low index section for the reflected beam. With more than one stage, the succeeding electro-optic means and plates are large enough to accommodate all possible beams from a preceding stage.

The realization of the above objects, along with the features and advantages of the invention, will be apparent from the following description and the accompanying drawing in which:

FIGURE 1 is a schematic view of a multistage light deflector and shows a light beam source directed to a window in a liquid-filled tank which has sets of polarization rotators and facing reflecting plates for deflecting light beams to a multioutput window, and FIGURE 2 is a schematic view of optical path length compensation means for the deflector plates and shows a compensating plate made of two sections having different indexes of refraction for the two output beams.

In FIGURE 1, there is shown a polarized light generator and deflector which is capable of positioning a beam of linearly polarized light in a plurality of paths so as to give eight outputs. The light generator 11 includes a light source 13 which is preferably a laser and provides a light beam or output. To convert the light output into a polarized light beam a polarizing device 15 is provided in the light path. Device 15 gives a light beam 17 which is linearly polarized in the vertical direction (parallel to the plane of the paper as indicated by the small vertical lines). This will be referred to as an ordinary beam. The subsequent representations of the beams are single lines indicative of the chief rays which move from left to right.

A plastic tank or rectangular container 21 is provided and holds a dielectric oil or other liquid 23 which is refractive-index-matching (for reasons subsequently to be explained). The wall of the container has an optically-flat entry window or crystal 25 disposed and suitably sealed in the path of the light beam for normal incidence thereon with unaltered transmission therethrough. The tank 21 has top cover 27 constructed to seal for exclusion of dust and the like. The tank 21 also has at the right an exit window 29 built like the entry window and disposed for perpendicular incidence thereon and unaltered transmission therethrough of the output beams. It is apparent that the tank arrangement can be rotated to give horizontal deflection, rather than the vertical positions for deflection as indicated by the light paths in the upright tank.

Each light deflector stage is immersed in liquid 23 and has two functional components. The first component which the light beam sees is an electro-optic switch or phase control means 31. Phase control means 31 has an electro-optic crystal 33, such as potassium dihydrogen phosphate. Other electro-optic crystals which can be used are ammonium dihydrogen phosphate and cuprous chloride. The electro-optic crystal 33 is bounded on each side by transparent conductive electrodes 35 and 36. Transparent electrode 35 is connected with suitable insulation and sealing via switch 37 exterior of the tank to a source of high positive potential +V. Electrode 36 is likewise connected to ground externally of the tank. If switch 37 is open (as shown), phase control means 31 has no effect on the polarized light beam 17. If switch 37 is closed, thus applying voltage between the transparent electrodes, an electric field is created in electro-optic crystal 33 which causes the vibration direction of a linearly polarized light beam to be rotated by ninety degrees (90°). A voltage of approximately 7700 volts is required to cause the rotation effect when potassium dihydrogen phosphate is used. The polarizing rotator 31 when effective produces a linearly polarized beam with a vibration in the horizontal direction (perpendicular to the plane of the paper, as indicated by the small circles). This will be referred to as an extraordinary beam. For electric reasons, the liquid (oil) has a high resistivity and resistance to high voltage breakdown.

The phase control means 31 is arranged in front of reflecting means 41 which is the next or second component of a deflecting stage to which the polarized light beam passes. The deflecting means 41 includes a birefringent plate 43 having an optical flat polished surface in the path of the light beam. The optic axis of the reflecting birefringent plate 43 is parallel to its reflecting surface and perpendicular to the plane of the drawing. This plate 43 is relatively thin (about one-fifth of an inch or less but sufficient to give rigidity) and preferably is a calcite crystal. Other birefringent crystals (such as sodium nitrate) can also be used. The calcite plate is inclined at twenty degrees to the light beam axis and thus presents an angle of incidence (70°) as an example, which is greater than the critical angle (63.6°) for total reflection for an extraordinary polarized light beam. The liquid 23 has an index of refraction which substantially matches the larger of the indexes of the calcite plate 43. A suitable oil is chlorinated diphenyl which was obtained from the Monsanto Chemical Company. An ordinary polarized beam will impinge on the surface of the calcite plate 43 at an angle in relation to the ordinary index of refraction which is less than critical. Thus, the ordinary beam will be completely transmitted. There will be no reflection losses or refraction for the transmitted beam since the index of the liquid matches the index of the negative uniaxial calcite plate. Above the calcite plate 43, an alignment plate 45 is positioned and has an optically flat polished surface arranged parallel to the reflecting surface of birefringent plate 43. It is apparent that the plates can be mounted by conventional means (not shown) which permit ease of adjustment for spacing and alignment. The crystal alignment plate 45 is made from a material which has a refractive index less than or equal to the low index of refraction of the material of the deflecting plate 43 so that total external reflection relative to the crystal (considering the angles of incidence) again occurs and the path of the deflected beam is aligned or made parallel to the transmitted beam. Crystal plate 45 can be an isotropic material, such as glass or sodium fluoride. The sodium fluoride which is used has an index (1.33), less than the extraordinary index (1.48) for calcite. Since the ordinary index for calcite is 1.65, the index for the oil substantially matches or equals 1.65. This results in the deflected and transmitted beams propagating in materials having substantially the same index of refraction.

The remaining two deflection stages are functionally identical to the first stage except for size and so will not be described in detail. Thus, phase control means 51 and 53 respectively have open switches 55 and 57 which are connected as previously described. Each second and third deflecting or birefringent means 61 and 63 respectively includes thin calcite crystal plates 65 and 66 and low index refraction aligning plates 67 and 68, with materials and arrangements corresponding to deflector 41. Exterior of the window 29 at the right, eight designations indicate the open (0) or closed (1) positions of the switches 37, 55 and 57, left to right. In other words, the numerical designations for the output points indicate the positions of the switches for the electro-optic devices, (0) indicating an open switch and (1) a closed switch. The three zero position (000) results from all switches being open while the one-zero-zero position (100) results from only the first switch 37 being closed, the second and third being open. Thus, with three open switches, a light beam passes through to the three zero (000) position at the window 29. One-zero-zero switch positioning gives a polarization rotation at optic switch 31 and reflection-alignment at 41, 61 and 63 to give output position (100). Operation to give the intermediate positions is believed apparent. It is, of course, implicit that the spacing and length of the plates increase from left to right by a factor of two so that an output of light beams may be obtained at the right of the deflector at any one of eight positions by control of the switches. In other words, the succeeding stages are sufficiently large to act upon all beams from a preceding stage and thus give a $2^n$ output when there are $n$ stages.

In FIGURE 2, it is apparent that the optical path difference for a stage of the deflector is equal to the reflected length (L) multiplied by $n_0$ minus the transmitted length ($l$) multiplied by $n_0$ which index is the same for both materials. When it is desired to compensate for this difference, a structure 70 having an upper section 71 and a lower section 73 is provided at the output of each stage. Section 71 passes the reflected-aligned beam or beams while section 73 passes the transmitted beam or beams. It is preferred that the plate 70 has a uniform thickness and the optical path length difference be compensated by using compensating indexed of refraction for isotropic sections 71 and 73.

By referring to FIGURE 2, it can be appreciated that the thickness (T) of the plate 70 (having top and bottom sections 71 and 73) can be obtained from the following trigonometric relation:

$$T = \left(\frac{n_0}{n_3 - n_2}\right)\left(\frac{D}{\sin X}\right)(1 - \cos X)$$

where $n_0$ is the ordinary index of refraction for the birefringent plate and the index of the oil, $n_2$ is the index of the upper section 71, $n_3$ is the index of the lower section 73, X is the illustrated angle (forty degrees with the calcite arrangement), and D is the total displacement between the transmitted and reflected rays. The thickness T of the compensating plate can be readily calculated as a function of D which is known.

When the following, for example, are substituted in the above equation:

$X = 40°$
$n_0 = 1.65$ for calcite and oil
$n_2 = 1.33$ for sodium fluoride
$n_3 = 1.85$ for dense flint glass the value for $T = (1.06)D$, which, of course, is not proportionately suggested by the schematic showing. It is to be appreciated that other materials would give different uniform thicknesses and that the sections 71 and 73 could have different thicknesses. It is to be understood that the incorporation of the compensating means in the FIGURE 1 arrangement would require greater spacing between stages and accommodation for the transmitted and reflected-aligned beams of each stage. With this arrangement, correlating the light path lengths in the two isotropic materials having different indexes results in the beams having equal optical paths. The compensating plate 70 thus gives equal length optical paths for each beam for each stage and the compensation when desired.

From the foregoing, it is apparent that the use of birefringent prisms has been avoided and that problems resulting from refraction are not encountered. Thin birefringent plates are used and thus reduce expense and are often more readily available. It is to be appreciated that the two polarized light beams propagate for deflection or transmission through materials having the same index of refraction. There is no refraction of the reflected beam or of the transmitted beam since the index of the liquid matches the index of the birefringent plate. If urea or other positive uniaxial birefringent crystals are used, equivalent considerations apply. It is to be noted that each deflector stage requires only two polished surfaces for reflection and that the oil protects the immersed elements.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A light deflector for selectively deflecting a polarized light beam having a first or second linear polarization direction, comprised of:
    birefringent means having an external reflecting surface oriented at an angle with respect to the axis of a polarized light beam for reflecting a light beam of a first linear polarization direction to provide a reflected beam and for passing a light beam of a second linear polarization direction to provide a transmitted beam, said second linear polarization direction being oriented at ninety degrees with respect to said first linear polarization direction,
    alignment means having an external reflecting surface disposed in the path of the reflected light beam for redirecting the reflected light beam in axial alignment with the transmitted light beam, and
    means providing an isotropic path for the polarized light beam as propagated with the isotropic path being a material which has an index of refraction corresponding to the index of refraction of the birefringent means which is effective on the transmitted beam whereby both light beams encounter material having the same index of refraction.

2. The light deflector in accordance with claim 1 and being further characterized by:
    said means providing an isotropic path being container means holding a liquid, and
    said birefringent means and said alignment means being positioned in the liquid.

3. The light deflector in accordance with claim 1 and being further characterized by:
    said birefringent means and said alignment means being thin plates which provide the reflecting surfaces.

4. The light deflector in accordance with claim 1 and being further characterized by:
    means for compensating the optical path difference of the beams comprised of first and second light transmitting transparent sections of relative thicknesses with the first section for the reflected beam being made of material having an index of refraction correlated to the index of refraction of the second section material for the transmitted beam so that the beams have equal optical paths.

5. The light deflector in accordance with claim 2 and being further characterized by:
    said birefringent means and said alignment means being thin plates,
    said liquid being an oil, and
    electro-optic switch means for changing the polarization of a light beam positioned in said liquid in front of the birefringent means.

6. The light deflector in accordance with claim 1 and being further characterized by:
    said birefringent means is a negative uniaxial crystal formed as a thin plate and having an extraordinary index and an ordinary index,
    said alignment means is a thin crystal plate having an index of refraction which is less than or equal to the extraordinary index of the birefringent crystal,
    said means providing an isotropic path being container means holding a liquid having an index of refraction which substantially matches the ordinary refractive index of the birefringent crystal,
    phase control means positioned in front of the birefringent means capable of either having no effect on a light beam or rotating the direction of polarization of the light beam by ninety degrees, and
    all of the preceding optic means being immersed in the liquid in said container means.

7. The light deflector according to claim 9 and being further characterized by:
    each of said birefringent means being rigid plates and made from calcite or sodium nitrate and having a thickness of less than one fifth of an inch, and
    said liquid being an oil material having an index of refraction which substantially matches or equals the larger index of the birefringent plate.

8. The light deflector according to claim 9 and being further characterized by:
    said phase control means including an electro-optic device effective to rotate the plane of polarization of light passing therethrough by ninety degrees, and electrical control means including a switch located externally of the container for selectively energizing said electro-optic device, and
    compensation means for each stage having two isotropic elements of equal thickness so that the optical path length found by an extraordinary ray beam in one of said elements is such in relation to the optical path length found by an ordinary ray beam in the other of said elements that the sum of the optical path length found by both rays is equal.

9. A light deflector for selectively deflecting a polarized light beam having a linear polarization comprised of:
    a container having a liquid therein and having an entry window to accept a linearly polarized light beam and an exit window for providing any one of a plurality of possible output beams, and
    a plurality of optically aligned cascaded beam deflecting stages immersed in said liquid with each succeeding deflecting stage being sufficiently large to accommodate all possible light beams from the preceding stage,
    each such stage comprising birefringent means oriented at an angle for reflecting a light beam of a first linear polarization direction to provide a reflected beam and for passing a light beam of a second linear polarization direction orthogonally disposed with respect to said first linear polarization direction to provide a transmitted beam, alignment means having an external reflecting surface disposed in the path of the reflected light beam for redirecting at said surface the reflected light beam in axial alignment with the transmitted beam, and polarization control means disposed before said birefringent and alignment means for providing the light beam with said first or second linear polarization direction,
    said liquid having an index of refraction corresponding to the index of refraction of the birefringent means effective on the transmitted beams thereby providing an isotropic path for the propagated beams.

10. The light deflector of claim 9, wherein a first plurality of said stages is positioned to deflect the light beam about a first common coordinate and a second plurality of said stages is positioned to deflect the light beam about a second common coordinate orthogonal to the first coordinate.

References Cited

UNITED STATES PATENTS

| | | | |
|---|---|---|---|
| 3,391,970 | 7/1968 | Sincerbox | 350—150 |
| Re. 26,170 | 3/1967 | Harris | 350—150 X |
| 2,745,316 | 5/1956 | Sziklai | 350—150 |
| 3,167,607 | 1/1965 | Marks et al. | 350—150 |
| 3,353,894 | 11/1967 | Harris | 88—10 |

OTHER REFERENCES

Nelson: The Bell System Technical Journal, "Digital Light Deflection," June 4, 1964, pp. 821–834.

Fleisher et al.: IBM Tech. Disc. Bulletin, "Digital Indexed Angular Light Deflection System," October 1963.

Kulcke et al.: IBM Tech. Disc. Bulletin, "A Fast, Digital-Indexed Light Deflector," vol. 8, No. 1, pp. 64–67, January 1964.

Schmidt: Official Processing of Information, "The Problem of Light Beam Deflection at High Frequencies," pp. 98–103, 1963.

PAUL R. GILLIAM, Primary Examiner

U.S. Cl. X.R.

350—152